(12) United States Patent
Streckert et al.

(10) Patent No.: US 6,939,449 B2
(45) Date of Patent: Sep. 6, 2005

(54) WATER ELECTROLYZER AND SYSTEM

(75) Inventors: Holger H. Streckert, Rancho Santa Fe, CA (US); Linden P. Blue, La Jolla, CA (US)

(73) Assignee: General Atomics, San Diego, CA (US)

( * ) Notice: Subject to any disclaimer, the term of this patent is extended or adjusted under 35 U.S.C. 154(b) by 218 days.

(21) Appl. No.: 10/328,665

(22) Filed: Dec. 24, 2002

(65) Prior Publication Data

US 2004/0118677 A1 Jun. 24, 2004

(51) Int. Cl.[7] ............................................. C25B 1/08
(52) U.S. Cl. ..................................................... 204/258
(58) Field of Search ................................ 204/265, 253, 204/256, 257, 258, 275.1, 277, 278, 266

(56) References Cited

U.S. PATENT DOCUMENTS

| | | | |
|---|---|---|---|
| 3,359,136 A | 12/1967 | Merten et al. | 136/86 |
| 3,391,027 A | 7/1968 | Porter, II | 136/86 |
| 3,616,334 A | * 10/1971 | Aker et al. | 204/265 |
| 4,078,985 A | 3/1978 | Takeuchi | 204/230 |
| 4,146,446 A | 3/1979 | von Sturm | 204/129 |
| 4,302,217 A | 11/1981 | Teitel | 48/180 |
| 4,436,793 A | 3/1984 | Adlhart | 429/17 |
| 4,683,014 A | * 7/1987 | Porowski et al. | 72/30.1 |
| 4,728,586 A | 3/1988 | Venkatesan et al. | 429/94 |
| 5,009,968 A | * 4/1991 | Guthrie et al. | 429/26 |
| 5,037,518 A | 8/1991 | Young et al. | 204/230 |
| 5,096,667 A | 3/1992 | Fetcenko | 420/580 |
| 5,110,436 A | 5/1992 | Schubert et al. | 204/129 |
| 5,401,371 A | 3/1995 | Oshima et al. | 204/258 |
| 5,484,512 A | 1/1996 | Sasaki et al. | 204/129 |
| 5,540,831 A | 7/1996 | Klein | 205/630 |
| 5,667,647 A | 9/1997 | Suga et al. | 204/237 |
| 5,690,797 A | 11/1997 | Harada et al. | 204/229 |
| 5,840,172 A | 11/1998 | Zugravu | 205/639 |
| 5,883,762 A | * 3/1999 | Calhoun et al. | 205/119 |
| 5,964,089 A | 10/1999 | Murphy et al. | 60/286 |
| 6,071,386 A | 6/2000 | Puthawala | 204/257 |
| 6,099,811 A | 8/2000 | Stetson et al. | 422/212 |
| 6,165,331 A | 12/2000 | Hughes | 204/254 |
| 6,303,009 B1 | 10/2001 | Bossard | 204/228.4 |
| 6,387,152 B1 | 5/2002 | Klassen et al. | 75/352 |
| 6,447,945 B1 | 9/2002 | Streckert et al. | 429/34 |
| 6,576,096 B1 | * 6/2003 | Andrews et al. | 204/266 |

OTHER PUBLICATIONS

Oelerich et al., Nanocrystalline Metal Hydrides for Hydrogen Storage (2000), EUROMAT 13, 141–145.

* cited by examiner

Primary Examiner—Roy King
Assistant Examiner—Harry D. Wilkins, III
(74) Attorney, Agent, or Firm—Fitch, Even, Tabin & Flannery (57) ABSTRACT

An electrolyzer for generating hydrogen by the electrolytic dissociation of water employs anode and cathode half-cells, separated by a planar polymer-based solid electrolyte, and includes a water reservoir for independently maintaining a desired level of water in the anode and cathode half-cells. A hydrogen exit chimney extends vertically upward from each cathode half-cell and enters a separation chamber; a gas exit passageway therefrom is closed by a separation membrane that allows the passage of $H_2$ but rejects liquid $H_2O$, while a return water passageway enters near the bottom of the cathode half-cell. The half-cells are preferably formed by molded plastic frames that are arranged as a cell stack containing a plurality of electrolytic cells, with flat metal anodes and cathodes being respectively sandwiched about the solid electrolyte membrane in each cell. A pair of flat crushable metal plates are located at each end of the cell stack adjacent a pair of pressure plates that exert axial squeezing pressure to seal the cells. Specially designed, dual metal-hydride cartridges are used to provide larger quantities of $H_2$ from a single cartridge; a high temperature metal hydride is provided in a rear region of the cartridge that is heated by an electrical resistance heater to a temperature of about 200° C. or above while room temperature metal hydride powder fills a front section of the cartridge.

8 Claims, 8 Drawing Sheets

WATER ELECTROLYZER AND SYSTEM

FIELD OF THE INVENTION

The invention relates to a relatively small water electrolyzer designed to generate hydrogen. More particularly, it relates to a water electrolyzer that will efficiently generate pure, dry hydrogen gas that is particularly well suited to power fuel cells and to be stored in metal hydride form, and it also relates to methods and systems for recharging high temperature hydride alloy cartridges and employing such cartridges to power fuel cells.

BACKGROUND OF THE INVENTION

It has been proposed to use fuel cells to supply power to small electronic devices, such as laptop computers, and for a variety of military uses, and it has also been proposed to provide hydrogen energy to those fuel cells from small cartridges containing metal hydrides that, at room temperature and/or higher temperature, generate a constant hydrogen partial pressure of suitable magnitude, as described in U.S. Pat. No. 6,447,945. However, to render such systems convenient and economical, it is necessary for the consumer, as well as the military, to be able to readily recharge such hydride storage cartridges as the cost of such cartridges is such that it is unlikely they would ever be a disposable item.

Although water electrolyzers have long been employed to create gaseous hydrogen and/or oxygen for commercial purposes, these devices have generally been designed for large scale operation, i.e. to produce relatively large quantities of $H_2$ and/or $O_2$ gas on an economical scale. Some efforts have been made to propose conceptual apparatus which might be suited for the present purpose; however, it is not believed that such has resulted in a truly commercially acceptable, small scale, hydrogen generator. Apparatus of this general type are shown in U.S. Pat. Nos. 5,037,518, 6,303,009, and 5,110,436; however, none of these has been considered to provide an adequate arrangement to efficiently generate hydrogen for small scale operations, such as refilling small cartridges designed to power portable electronic devices. Moreover, none has the ability to conveniently and efficiently handle and recharge cartridges that utilize high temperature metal alloy hydrides.

Accordingly, the search has continued for an apparatus that can be constructed to efficiently and economically supply hydrogen for recharging for such small cartridges and particularly for methods and systems for efficiently recharging high temperature hydride alloys in cartridges that are suitable for use in fuel cell power applications.

SUMMARY OF THE INVENTION

The invention provides apparatus for generating hydrogen electrolytically from water which employs an electrolytic cell wherein an anode and a cathode are separated by a solid polymer-based electrolyte and wherein a water reservoir is provided to supply water by gravity independently to both the anode and the cathode of each cell When electric power is appropriately supplied to the anode and cathode to drive the electrolytic dissociation of water, hydrogen (the desired product) exits from the cathode via a chimney located at one end of the upper region of the cell, which chimney has an interior surface that is formed of hydrophobic material to minimize aqueous hydrogen bubbles being carried upward in the gaseous hydrogen stream exiting the cathode side. Oxygen exits via an independent exhaust port associate with the anode side of the cell. A separation membrane is located above the chimney in the hydrogen exit pathway; it permits the passage of hydrogen vapor but rejects water in liquid form, as would be present from bubbles or entrained in the hydrogen stream. The water that is separated from the hydrogen and any water vapor by the membrane at this location is returned by gravity through a separate return passageway that leads to the bottom of the cathode side of the cell.

In one preferred embodiment, the invention also provides an assembly of such electrolytic cells in the form of a multiplicity of these cells arranged in a stack with the solid polymer-based electrolyte members of each cell being planar and parallel to one another. The stack is preferably formed from a plurality of molded plastic frames which are generally flat, the majority of which have two oppositely facing wells or cavities facing outward from a central planar solid wall for respectively forming anode and cathode half cells. A planar solid electrolyte is sealed, as by pairs of peripheral gaskets on each side, between adjacent facing surfaces of two such frames, this respectively provides one anode half-cell and one cathode half-cell that together form a single cell. A single cavity frame is provided to form the last anode and the last cathode at each respective end of the stack. A pair of end pressure plates flank the entire stack and are used to provide the compressing force to accomplish sealing of the individual cells. When the stack is squeezed axially, this force is spread substantially uniformly across the entire planar area of each cell of the stack as a result of the insertion of a pair of resilient metal spreader plates, one between each end pressure plate and the single cavity frame at each end of the stack.

The invention further provides a system designed to efficiently recharge speciality cartridges containing a high temperature metal alloy hydride wherein an electrolytic, $H_2$-generating station and an $H_2$-charging station for a cartridge supplying both with electrical power. During operation of the system, some of the power which is being supplied to the system is directed to the charging station where it powers an electrical heating unit embedded near the interior surface of an insulated sidewall of the specialty hydride cartridges. The heater is operated so as to raise the temperature of the cartridge to at least about 200° C., e.g. 200–300° C., at which elevated temperature the particular metal alloy will readily adsorb hydrogen. The individual specialty cartridges are designed so as to contain a major portion of such high temperature hydride along with a minor portion of a room temperature alloy hydride material, which will adsorb and desorb hydrogen at about room temperature or above. When such charged cartridges are subsequently employed as a source of power for a fuel-cell-driven device, a small portion of the electrical power being generated at the fuel cell is used to supply heat to a cartridge heater or heaters to raise the interior temperature thereof so that the high temperature metal alloy begins to desorb its hydrogen. Such high temperature alloys may exhibit a hydrogen storage capacity about three to five times as great, on a weight percentage basis, as that of usual room temperature metal hydride alloys; thus, there can be a significant advantage in being able to utilize a combination of both such alloys in speciality cartridges of this type.

DETAILED DESCRIPTION OF THE PREFERRED EMBODIMENTS

Figures 2, 10:
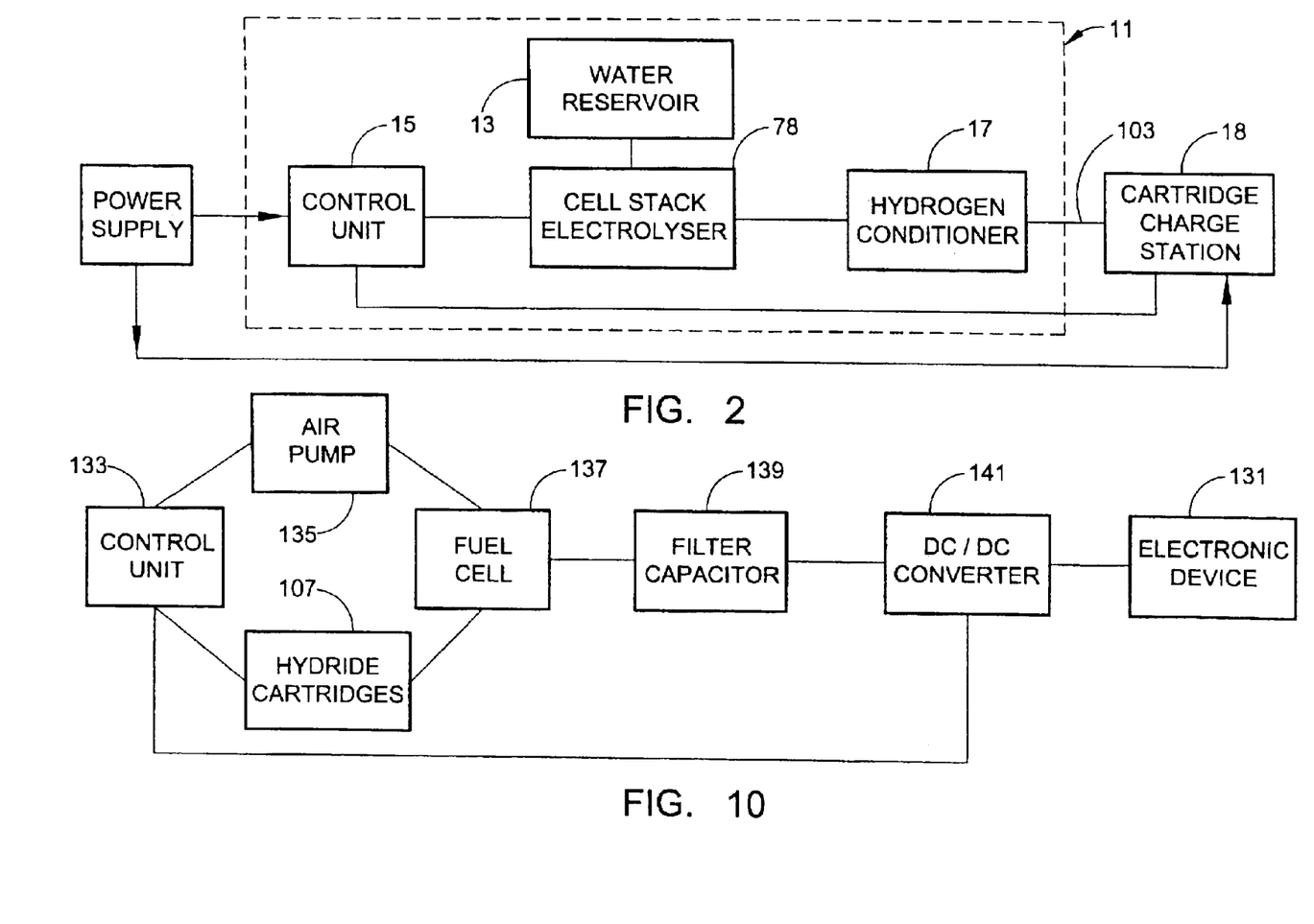
FIG. 2 is a schematic layout of an overall apparatus which includes a pure hydrogen-generating station and a cartridge-charging station embodying various features of the invention, which is designed to recharge the hydride content of a specialty cartridge, such as that shown in FIG. 9.
FIG. 10 is a schematic view representative of the use of the hydride content of a specialty cartridge such as that shown in FIG. 9 to power an electronic device having a fuel cell.

FIG. 2 shows a schematic layout of an overall apparatus, which includes a hydrogen generating station (in the dotted box) or electrolyzer 11 and a cartridge-charging station 18 in combination with an electric power supply. The hydrogen generating station includes an electrolyzer unit as its key component. The electrolyzer unit is provided with water from a water reservoir 13 and power from the power supply through a control unit 15. The oxygen generated in the electrolytic cells is simply exhausted to the atmosphere, whereas the hydrogen is fed through a hydrogen conditioner 17, which first separates liquid water entrained therein and then dries the gaseous hydrogen stream before feeding it to a cartridge charging station 18.

Figure 1:
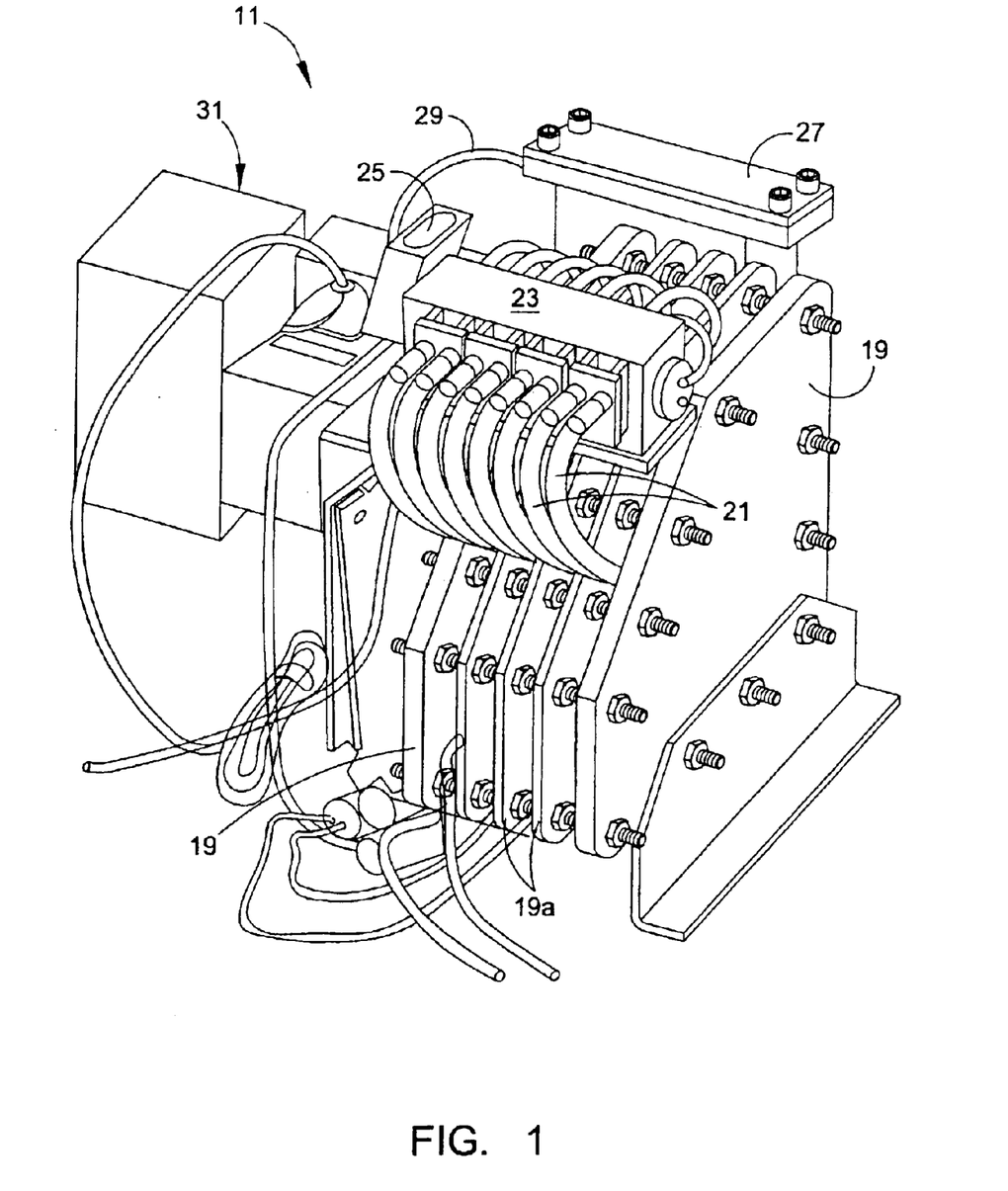
FIG. 1 is a perspective view of an electrolyzer in the form of a prototype model embodying various features of the invention.

A prototype model of an electrolyzer unit embodying various features of the invention is illustrated in FIG. 1, which was utilized to prove the concept of the operation. The illustrated prototype utilizes four series-connected cells that are arranged between a pair of end plates 19, which are clamped together to provide axial pressure to hold the individual cell frames in tight engagement with one another, as by tightening nuts on long, threaded rods. In the prototype, it can be seen that there are three separate intermediate plates 19a that are provided. However, in the preferred embodiment which is illustrated schematically in FIG. 8, only the two thicker end plates 19 are employed, and instead of using eight half-cell frames as was done in the prototype, two end half-cell frames would be used in combination with three double-sided cell frames as explained hereinafter.

In the prototype embodiment, each cell is arranged between a pair of plates 19, 19a as part of the 4-cell stack, and water carrying tubes 21 extend from a filling mechanism 23, that is positioned atop the cell stack to each half-cell. The tubes 21 provide individual reservoirs of water for each of the half-cells; moreover, they provide separate water supplies to the anode half-cell and to cathode half-cell of each electrolytic cell. Pure, demineralized water is supplied through an open fill station 25 at the top and flows into the tubes 21 when the mechanism 23 is in the open position.

The desired product of the electrolyzer is pure gaseous hydrogen, and a hydrogen-water separation unit 27 is located above the electrolytic cells. The gaseous hydrogen from the separation station unit 27 travels through a conduit 29 to a hydrogen drying station 31, described in detail hereinafter. Water is separated from hydrogen at the separation station 27 and is returned to the individual cathode half-cells. The overall arrangement is such that, once the electrolyzer has been filled with water through manipulation of the fill mechanism 23, it becomes a closed system, so there is no longer any direct connection to the outside atmosphere. The upper ends of the eight water supply tubes are, respectively, connected to two plenums which respectively fill with hydrogen and oxygen being generated at the cells and which are in fluid communication with the water reservoirs through the fill mechanism. The head of water in the tubes 21 assures the individual half-cells are kept full of water from these individual reservoirs. Generally, a sufficient water capacity is provided to allow from 5 to 10 charging cycles of hydride cartridges before refill is needed.

The hydrogen exiting the drying station 31 is directed to a cartridge charging station. The oxygen is simply exhausted to the atmosphere through a pressure-regulating valve 32 associated either with each half-cell or preferably with a plenum so only one oxygen pressure-regulator is needed; no attempt is made to separate water from the oxygen. Preferably, the $O_2$ exit stream is associated with the $H_2$ dryer 31; for example, it may be used to contribute some cooling effect for a heat sink that is a part thereof. The valve 32 is set to assure that pressure is maintained on the oxygen side approximately equal to the pressure on the hydrogen side, so as not to distend the thin planar electrolyte panels or plates that separate the anode and cathode halves of each electrolytic cell.

Figure 3A:
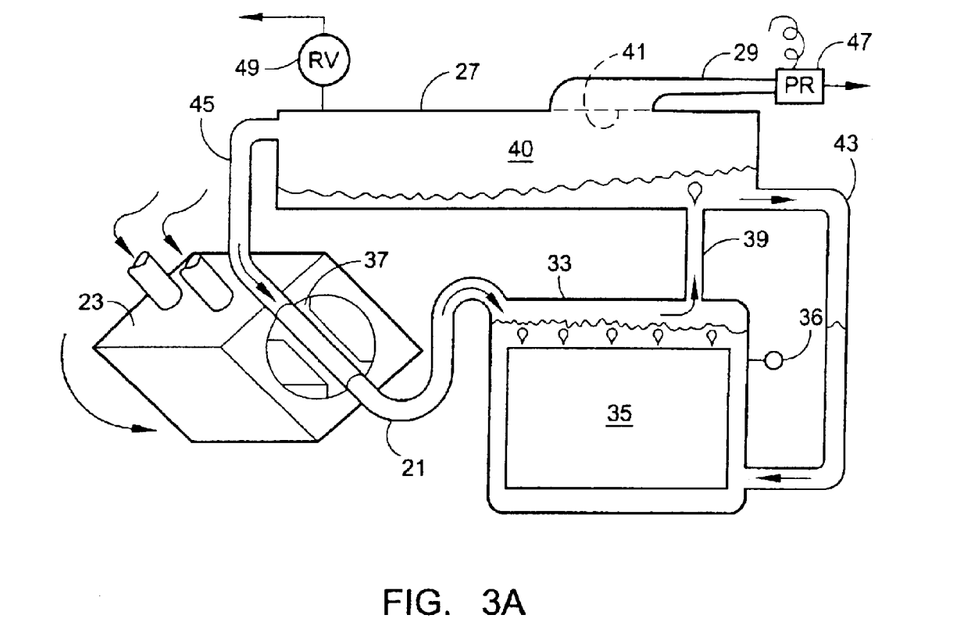
FIGS. 3A and 3B are schematic views of the water fill station which allows the apparatus to be filled with sufficient water to effect the charging of a large number of hydride cartridges, showing it in operation and when filling is occurring, and including the exit from a cathode cell and the initial water separation.
Figure 3B:
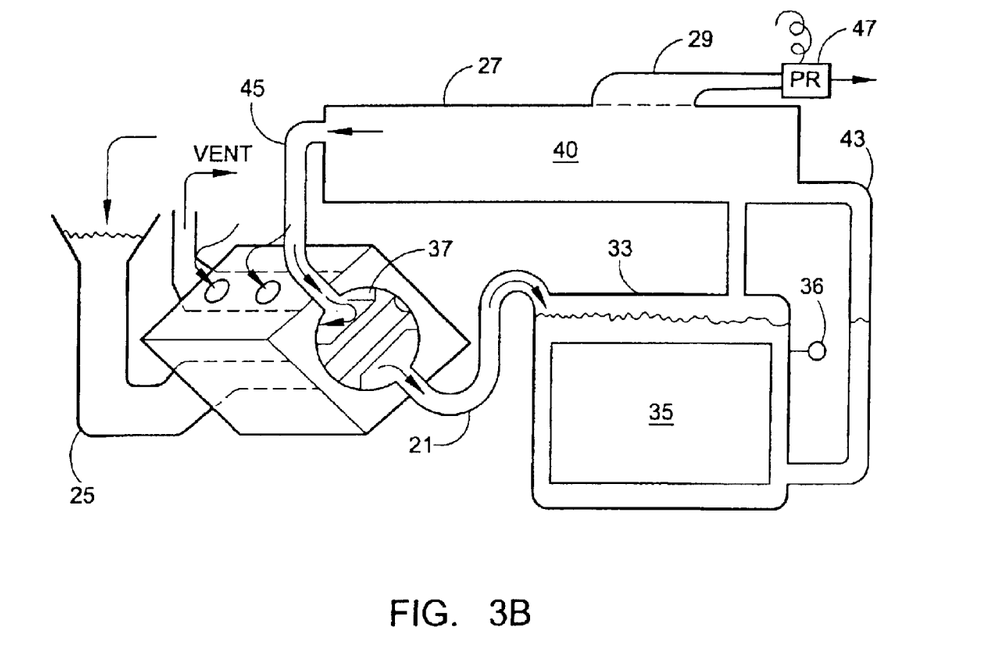

FIGS. 3A and 3B schematically show the overall arrangement of the electrolyzer, with the FIG. 3A depicting the electrolyzer in operation and FIG. 3B depicting the electrolyzer in the filling mode. Those figures depict schematically the water fill mechanism 23, the hydrogen separation device 27, a hydrogen half-cell 33 of one of the electrolytic cells, and the water reservoir conduits 21, which lead from the fill mechanism 23 to the cell 33. The water supply entrance 25 to the fill mechanism is depicted only in FIG. 3B.

The arrangement is such that each of the half-cells will initially be totally filled with water. FIG. 3A shows the water at a level just above that of the solid polymer-based electrolyte plate, which is shown schematically by the rectangle 35; this is indicative of normal operation. A low water sensor 36 may be included to signal when it is time for refilling. The water fill mechanism 23 includes a rotatable valve member 37 which, when rotated 90°, switches the mechanism between operating mode and fill mode. In the fill mode, the valve member connects the water supply 25 with the reservoir tubes 21; filling is accomplished via gravity and assures that each of the half-cells and the eight water tubes are initially filled to capacity.

During operation of the electrolyzer as depicted in FIG. 3A, the hydrogen that is formed in each half-cell travels to the upper reaches within the frame constituting the cathode half-cell, as explained in more detail hereinafter. Hydrogen has a tendency to create bubbles and to entrain water, and it is desirable to minimize the amount of water that is carried along with the hydrogen exiting from the cell. At the top of each cathode half-cell, the hydrogen enters a chimney 39 which begins in upper region of the frame (see FIG. 5B) and has an interior surface that is formed of hydrophobic material, such as polytetrafluoroethylene. The presence of such material tends to avoid foam or froth depositing on the surface, which may tend to clog the chimney, with the potential result of promoting water being carried upward with the ascending column of $H_2$ gas. The internal diameter of the chimney 39 is sufficiently small that water which is being separated in the main chamber 40 of the separation device 27, does not return through this hydrophobic interior passageway; in this respect, the chimney 39 preferably has a diameter between about 2 and 5 millimeters.

A separation membrane 41 blocks the entrance to the hydrogen exit passageway 29 at the top of the separation chamber 40. The membrane is one of those commercially available which allows water vapor and gas to pass, but which serves as an effective barrier to liquid water, such as that marketed as the Gortex polytetrafluoroethylene membrane. The entrained water that is separated from the generated hydrogen accumulates at the bottom of the separation chamber 40 and is returned to the bottom of the half-cell 33 via the separate return passageway 43 shown in FIG. 3A that leads directly to a location near the bottom of each cathode half-cell. There is also an interconnection via a conduit 45 to the water fill mechanism 23 which allows $H_2$ gas to fill the region above the cathode cell fill tubes of the $H_2O$ reservoir and prevent a vacuum from forming.

FIG. 3B shows the electrolyzer and the fill mechanism in the fill mode with the valve member 37 having been rotated 90° from the orientation depicted in FIG. 3A. In this orientation, the conduits 21 leading to the eight half-cells are all connected directly to the water supply chamber 25 which assures all eight cells are refilled to the desired level and that all the conduits 21 are fully flooded with water. The arrangement is such that the level of water within each half-cell just covers the tops of the electrolyte panels and the electrodes, which provides some space for entrance into the bottom of the chimneys 39 in the cathode half-cells. At the same time as when the valve member 37 is connecting the tubes 21 to the water supply chamber 25, the chamber 40 where hydrogen gas accumulates is vented to the atmosphere, as depicted in FIG. 3B, in order to allow the half-cells and the conduit reservoirs 21 to readily fill with water. A corresponding region where the oxygen, which is being generated, is accumulating upstream of the pressure-regulating valve 32 is also vented to the atmosphere through the fill mechanism 23, as depicted schematically in FIG. 6B.

Figure 4:
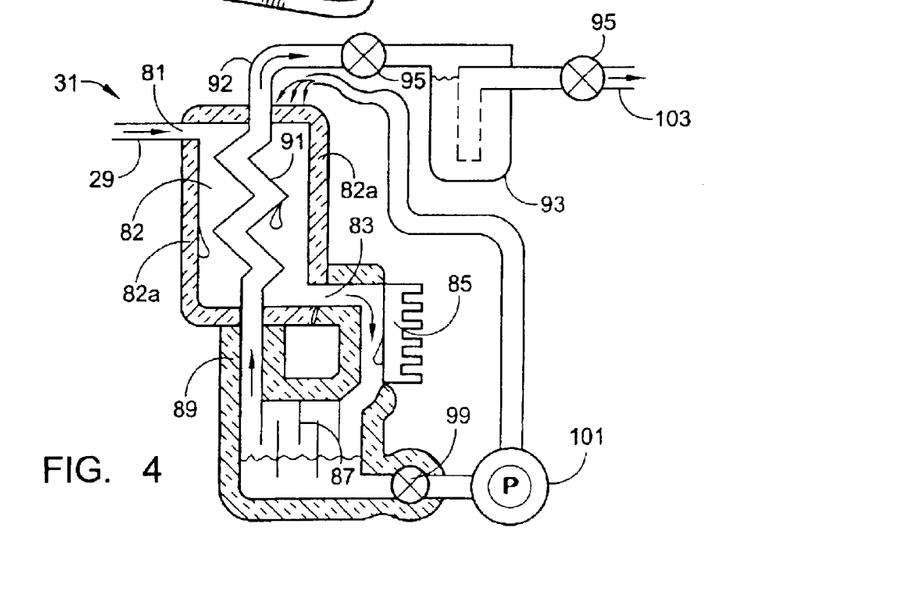
FIG. 4 is a schematic view showing the operation of the hydrogen dryer depicting the condensation of water vapor carried by the hydrogen stream and the supply conduit through which dry $H_2$ is routed to the charging station.

The hydrogen that passes through the separation membrane 41 at the top of the separation chamber 40 flows to a drying station 31 where it is further purified by the removal of water vapor that is carried by the hydrogen gas. This can be accomplished in any of a variety ways; however, it is preferably carried out by reducing the temperature of the gaseous hydrogen stream so that condensation of the water occurs, which accumulates in a water trap from which it is periodically removed. The water which is removed may routed to evaporatively precool the incoming $H_2$ stream or can be used to cool a heat sink for a chiller or cooler. The hydrogen stream exiting the condensation dryer is caused to flow through a final desiccant station to assure that ultradry hydrogen is being supplied to the cartridge charging station 18. A preferred drying station 31 is illustrated in FIG. 4 and explained in detail after the description of the cell stack.

The pressure within the hydrogen purification and supply system is regulated by a pressure monitor or regulator 47 which is connected to the control unit so that the $H_2$ gas being supplied to the charging station is maintained at a desired pressure. It may be located in the conduit 29 between the water-separator 27 and the dryer 31 as shown in FIGS. 3A and 3B, or it may be located downstream of the dryer. The control unit 15 oversees the entire operation, and should it detect a substantially greater hydrogen pressure, the control unit removes power from the cells, momentarily halting further operation of the electrolyzer. Generally, the $H_2$ gas being supplied to the charging station will be at a pressure between about 2 and about 10 atmospheres (atm), and preferably at a pressure between about 3 and about 5 atm. Simply for safety purposes, a pressure-release valve 49 is included somewhere in the overall conduit system to simply vent the hydrogen should the pressure rise substantially above the upper desired pressure limit that is set for normal operation, which would be an indication that some malfunction had occurred in the control unit or in the electrolyzer; such is schematically depicted in FIG. 3A. As previously stated, the pressure on the oxygen side of each cell is maintained at about the pressure that is set for the hydrogen side. The pressure-regulating control valve 32 in the oxygen exit network is arranged to open momentarily whenever the pressure on the oxygen side exceeds the pressure in the hydrogen exit conduit system. It may also be controlled by the control unit 15, or alternatively, it may just be set to vent $O_2$ whenever a preset pressure is reached. A safety pressure-release valve is also included in the oxygen exit passageway system to automatically open should a dangerously high $O_2$ pressure be detected that would be indicative of some failure in the control unit monitoring and regulating arrangement.

Details of the cell stack arrangement for the electrolyzer 11 are shown in FIGS. 5–5B and 6–6B. In the exploded perspective illustrated in FIG. 5, a single electrolytic cell from the prototype is shown, which would be representative of the farthest right hand cell in the embodiment shown in FIG. 1. The pressure plates 19 and 19a are omitted; however, a novel load-spreading plate 53 having a plurality of indentations 55 is employed at one or preferably at both ends of the cell stack, between the pressure plate and the half cell frame. More particularly, one electrolytic cell includes a hydrogen-generating cathode half-cell frame 57 and an oxygen-generating anode half-cell frame 59, which sandwich a central solid polymer-based electrolyte plate or membrane 61 that is slightly larger in dimensions than two flanking pairs of supporting, highly conductive, metal screens that function as the electrodes. Each pair of screens includes a metal screen 63a of small openings positioned in contact with the electrolyte plate and a screen 63b with larger openings in contact with it. The screens are made of a highly conductive metal material, having an electrical resistivity at least about equal to that of 304 stainless steel, and are preferably made of silver, gold or stainless steel coated with either silver or gold and have a thickness of about 0.8 mm. The openings in the screens are on the order of about 1 to 2 mm. The openings in the screen 63b having the larger openings are at least about 10% larger than the smaller openings in the screen 63a which abuts the solid electrolyte plate; for example, the smaller openings in the screen plate 63a may be about 1.2 mm, and the openings in the other screen may be about 2 mm. The screens serve as the electrodes and are accommodated in wells or cavities respectively provided in the hydrogen and oxygen half-cell frames 59 and 57, which cavities are in the region that would be filled with water to a level above the electrodes in the operating electrolyzer. Each cavity is peripherally surrounded by a continuous groove 65 in the face of each cell frame that receives a sealing ring. Thus, in the assembled cell stack, the half-cell frames are pressed against the opposite surfaces of the solid polymer-based electrolyte plate 61, sealing and containing the liquid and gas therewithin for each half-cell. Support for the electrode screens 63 in the cavity is provided by a plurality of parallel ridges 67 against which the larger opening screen 63b abuts, with the regions between the ridges being filled with water in each half-cell.

Figure 5:
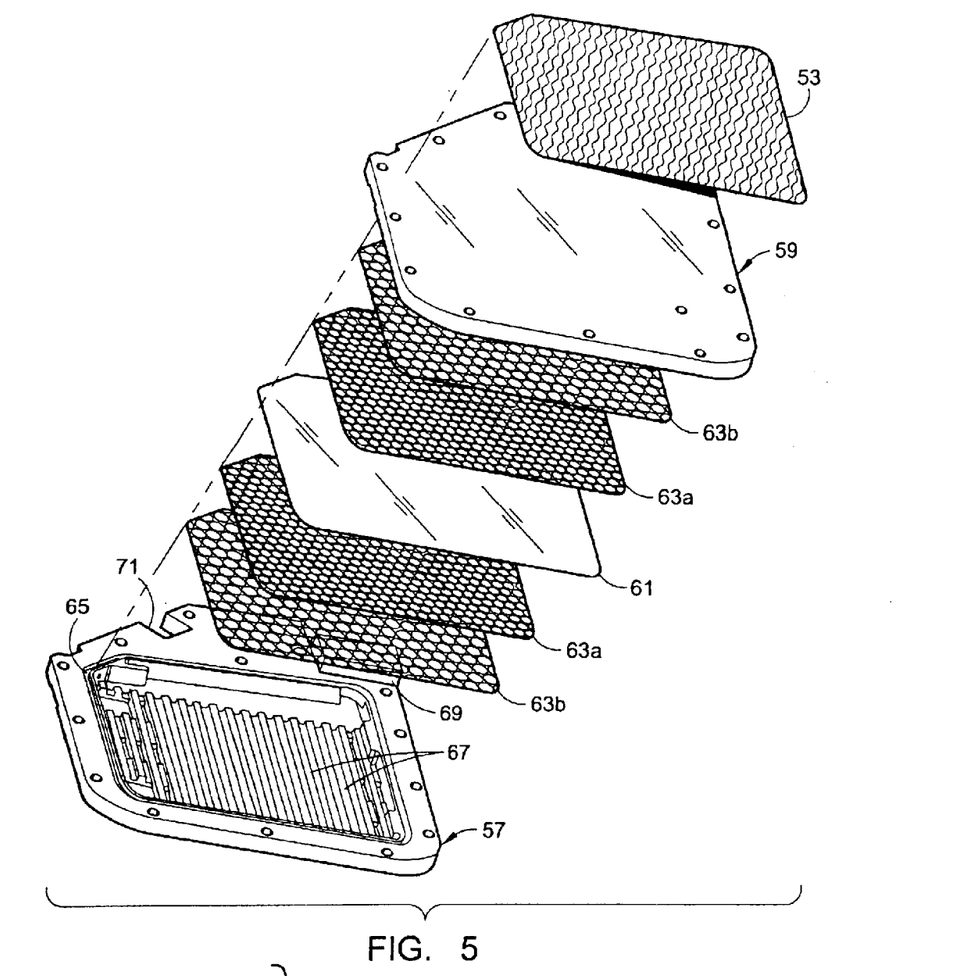
FIG. 5 is an exploded perspective view showing one cell of the electrolytic cell stack of FIG. 1.
Figures 5A, 5B:
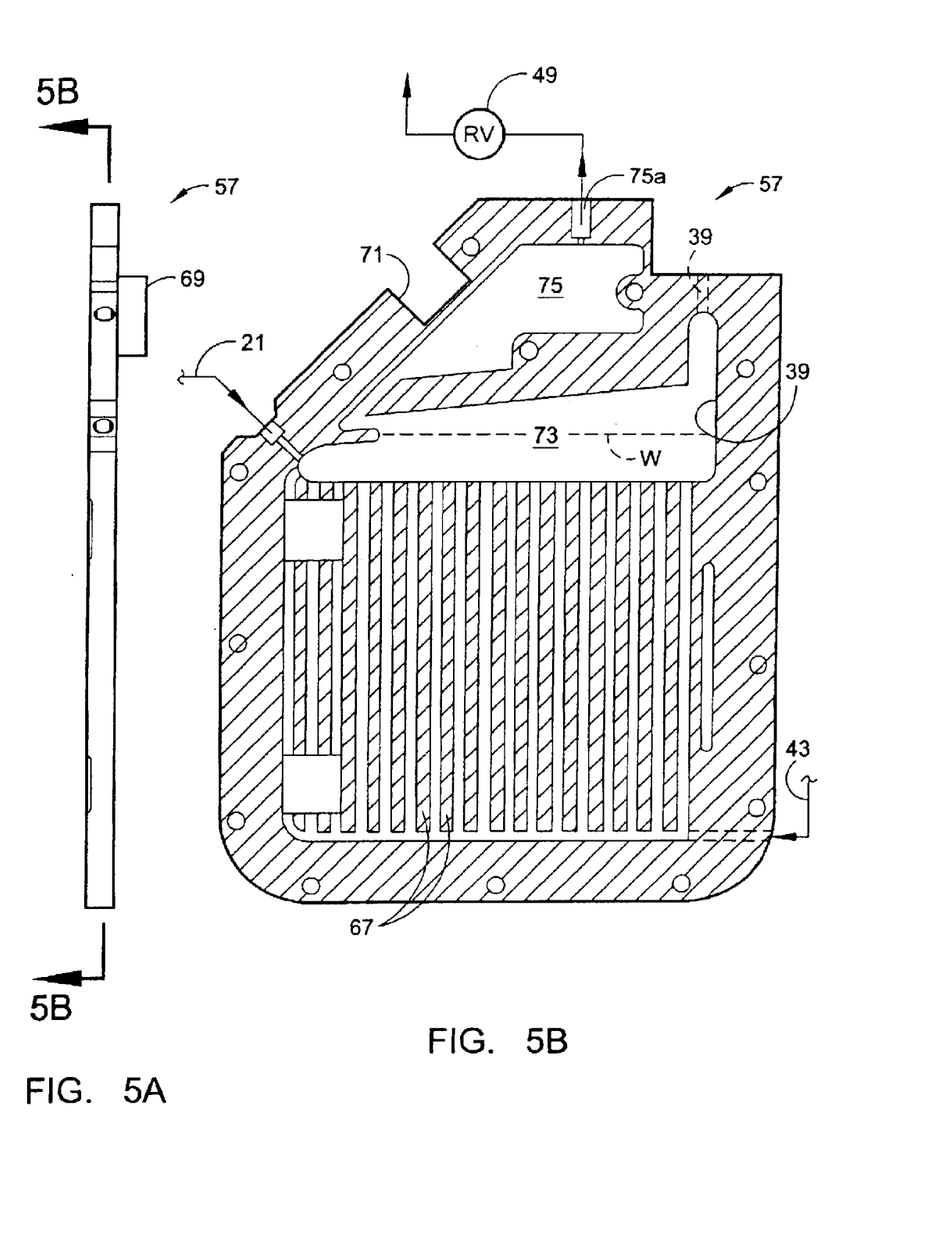
FIGS. 5A and 5B are sectional and side views of the cathode half-cell frame of FIG. 5.

The hydrogen half-cell frame 57, shown at the bottom of the exploded perspective in FIG. 5, is more particularly exemplified in FIGS. 5A and 5B. The hydrogen half-cell frame is generally flat except for an upper protrusion 69 that extends from its right hand surface in FIG. 5A; it can be seen lying just below the larger opening screen 63b in FIG. 5. This protrusion 69 is received in a recess 69a provided at the top edge of the oxygen half-cell screen for alignment purposes. Similarly, a cutout 71 in the diagonal edge of the hydrogen half-cell frame receives a lug 71a which protrudes from the facing surface of the oxygen half-cell frame 59.

FIG. 5B is a section view taken through the hydrogen half-cell frame 57, and this illustrates the lower portion of the chimney 39 that extends upward from a hydrogen collection zone 73 immediately above the electrode. It also shows an upper gas pocket 75 that overlies the half-cell and provides a passageway leading to an outlet 75a through which an alternative connection can be made to the pressure relief valve 49 that is shown schematically in FIG. 3A as being in fluid communication with the chamber 40. Also seen in FIG. 5B is an inlet passageway near the bottom of the diagonal edge portion of the cell frame through which the water reservoir tube 21 would be connected, as a result of which the level of water in the cell would normally be maintained at about the level of the dotted line labeled "W" in FIG. 5B. The hole pattern along the edge of the half-cell frame permits the passage of long threaded bolts or the like that are used for applying the axial clamping or squeezing pressure in the final cell stack. The return water inlet passageway is also shown at the bottom of the right-hand side of the cell frame 57 to which the water return conduit 43 would connect.

Figure 6:
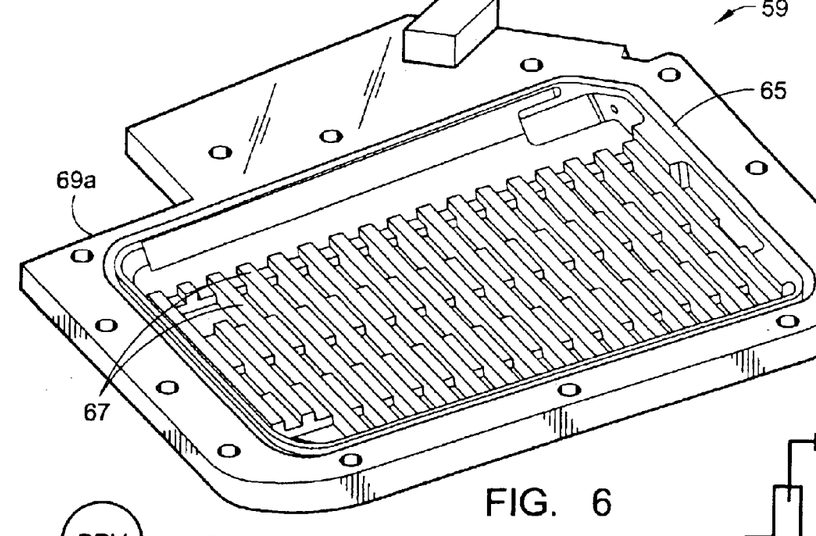
FIG. 6 is a perspective view of the anode half-cell frame shown in FIG. 5, and FIGS. 6A and 6B are sectional and side views thereof.
Figure 6A:
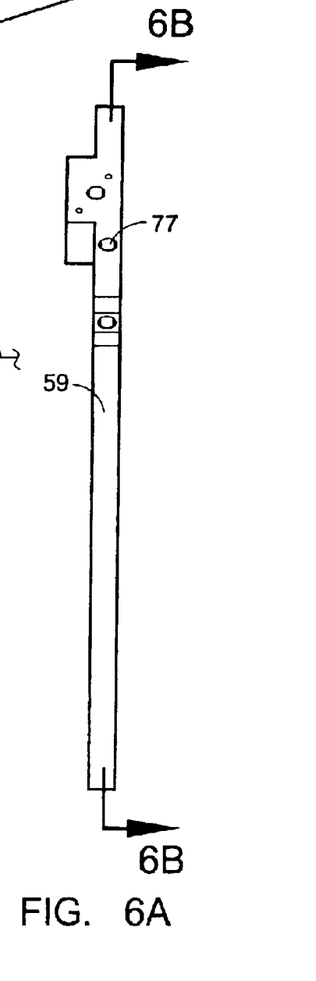
Figure 6B:
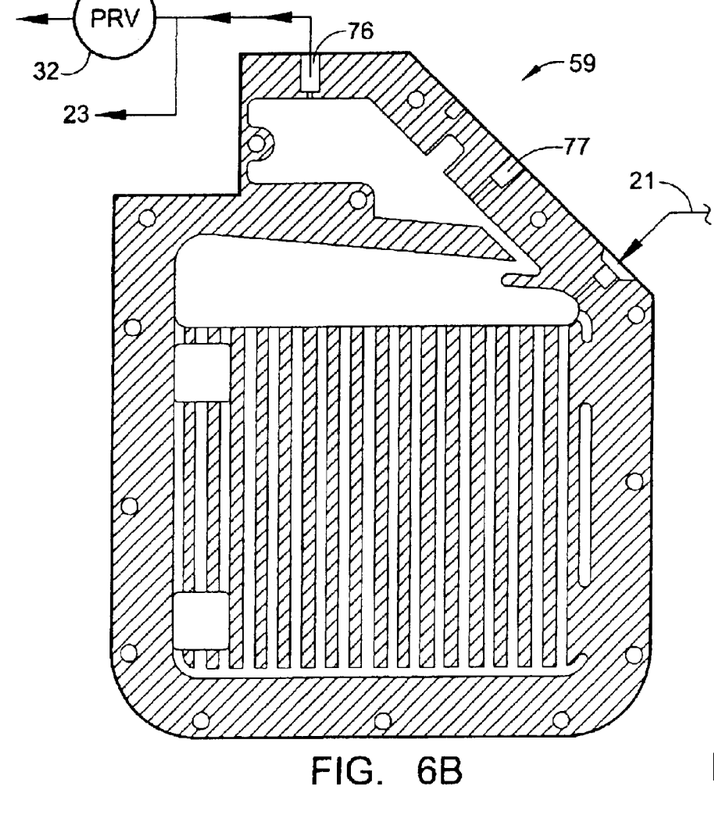

The oxygen half-cell frame 59, depicted in FIGS. 6, 6A and 6B, is generally similarly constructed; it also contains a plurality of supporting parallel ridges 67 against which the larger opening screen 63b would abut and a peripheral groove 65 that holds the sealing gasket that will seal against the surface of the solid polymer-based electrolyte plate 61. The positioning lug 71a is best seen in FIG. 6; it assures there is precise alignment between the two facing half-cell frames. Because there is no attempt made to separate water and/or water vapor from the oxygen, only a single gas outlet passageway 76 needs to be provided; a passageway 77 is provided for either a supporting, or leading to, a pressure relief valve that is similarly provided for safety considerations. Optionally, an passageway may be provided for connection to a conduit system leading back to the fill mechanism 23 to vent the oxygen half-cells at the time of refilling; however, such a connection may be provided simply through a tee in the line in the oxygen outlet passageway system connected to the outlet 76, at a location upstream of the $O_2$ pressure-regulating valve 51.

When the cell stack is assembled, the pairs of screens 63a and b that constitute the electrodes will first be interfit within each cavity, and the thin solid electrolyte plate 61 will be sandwiched between the respective half-cells so that the peripheral sealing gaskets in the grooves 65 are squeezed against the respective surfaces of the electrolyte plate. Between the outermost oxygen cell at the right hand end of the cell stack that is illustrated in FIG. 5 and the pressure plate 19 that applies the sealing force in an axial direction, the load-spreading sheet or plate 53 is positioned. An identical plate 53 is preferably similarly interposed at the opposite end of the stack.

Figure 7:
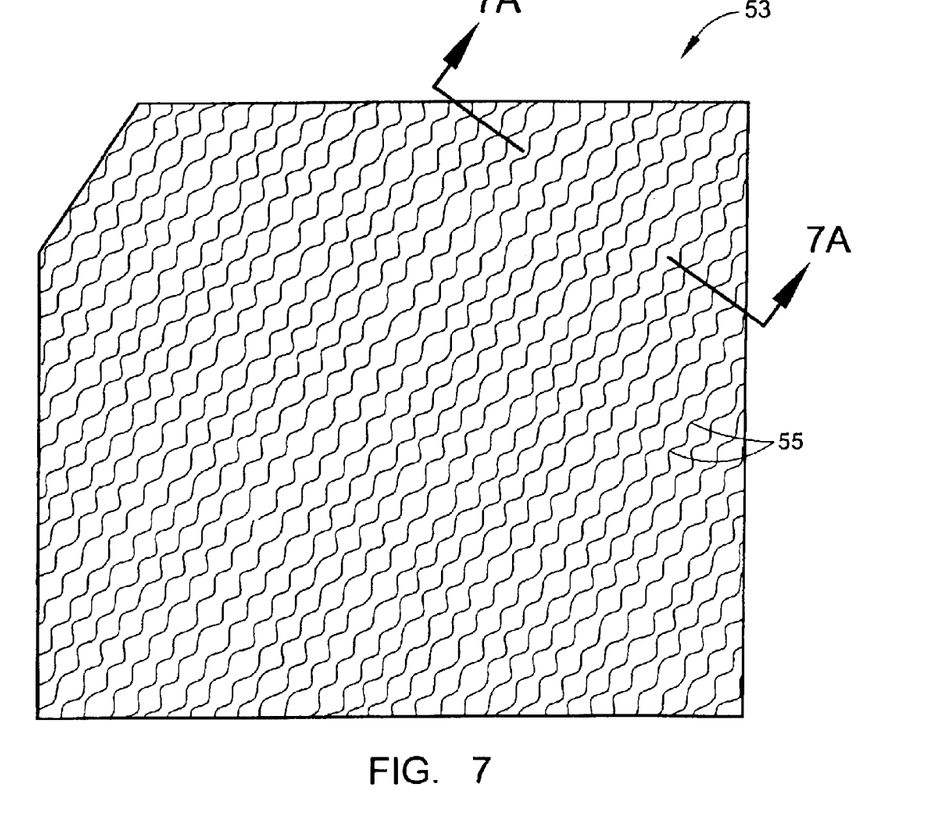
FIG. 7 is a front view of the load-spreading resilient metal plate located at each end of the cell stack.
Figure 7A:
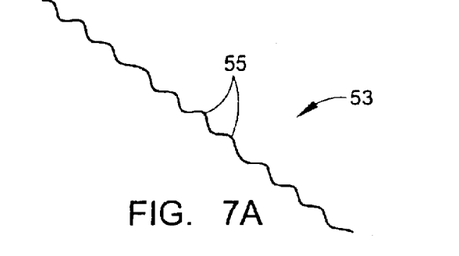
FIG. 7A is a cross-sectional view through the resilient plate of FIG. 7 taken generally along the line 7A—7A thereof.

This plate 53 is shown in detail in FIGS. 7 and 7A. It is preferably formed from a fairly thin strong metal having a thickness between about 0.2 mm and 0.5 mm and having at least about the strength of stainless steel. It should have a modulus of elasticity of at least about 200 gigapascal (GPa) or greater. For example, it may be made of stainless steel about 0.3 mm thick. It is deformed with an overall pattern of prismatic indentations 55 so that the thickness of the load-spreading plate 53 is at least about three times the thickness of the metal sheet from which it is formed and is preferably between about 5 and about 10 times the thickness of the metal sheet. The prismatic indentations are aligned at an angle between about 45° and about 70° to the horizontal plane of the overall plate. Thus, the individual indentations 55 provide a myriad of peaks and valleys in both surfaces of the plate. Although they can be oriented in any desired pattern, it is preferred and economical to orient them in the manner best seen in FIG. 7, i.e. a series of essentially parallel rows made up of alternating short prismatic indentations 55 that are aligned at about 120° to one another. As a result of the material that is chosen and of this pattern of deformation, the plates are "crushable", i.e. will resiliently deform, and in that manner they will spread the axial pressure, that is being applied at both ends of the cell stack, substantially uniformly across the entire surfaces of the two end anode and cathode half cells 59 and 57, along with all the rest of the cells in the stack. This load-spreading in combination with the screens 63a and 63b assures that there is uniform force across the entire surface of the solid, polymer-based electrolyte plates maintaining the electrodes in tight contact therewith. This assures both efficient production of hydrogen and oxygen and tight sealing at the peripheral gaskets of each cell.

Figure 8:
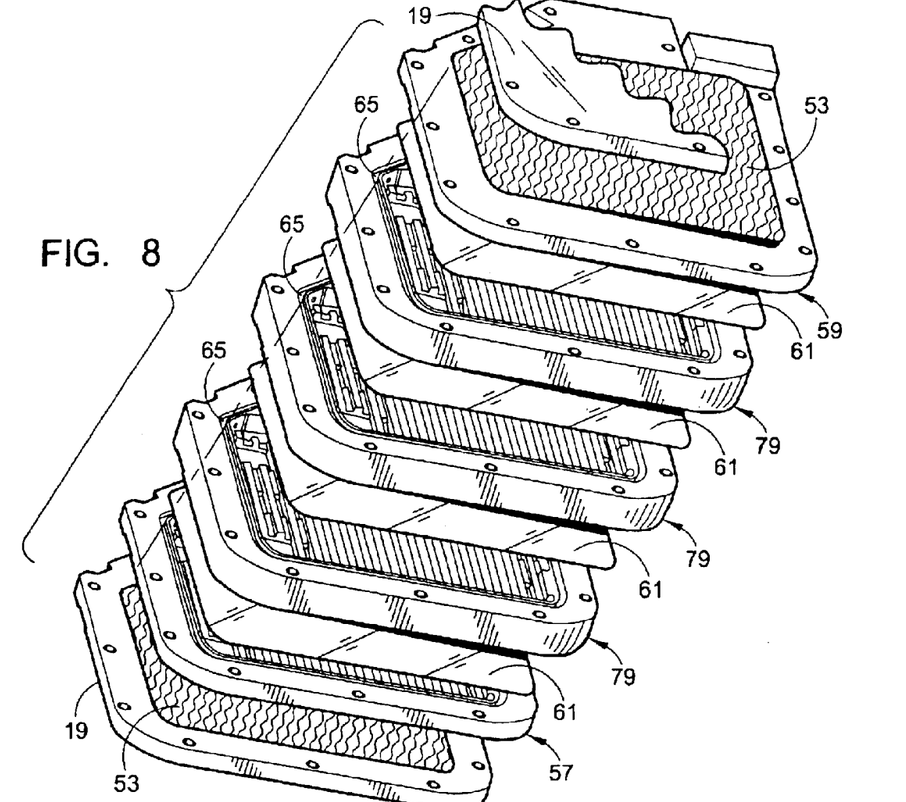
FIG. 8 is an exploded perspective view showing a 4-cell stack that employs 2-sided cell frames.

Although the prototype electrolyzer 11 is shown in FIG. 1, which is constructed of four separate hydrogen (cathode) half-cell frames and four separate oxygen (anode) half-cell frames, as earlier mentioned, the commercial embodiment is fashioned as a cell stack 78 having only one of these half-frames at each end of the stack and three center dual frames 79, as depicted in FIG. 8 wherein the screens have been omitted for clarity. As can be seen, each of the center frames 79 is about twice as thick as one of the half-cell frames 57, 59. It simply has two oppositely facing wells or cavities to receive the screen electrodes, which cavities are the full equivalents of those shown and described with regard to FIG. 5-5B and 6-6B. Preferably a load-spreading plate 53 is provided at each end of the stack between the end half-cell frame and the pressure plate 19.

The hydrogen drier unit 31 is more specifically illustrated in FIG. 4. As previously mentioned, the hydrogen stream being generated in each of the four cathode half-cells exits via the chimney 39 and travels first through the separation chamber 40 and the membrane 41, which allows the passage of gas but rejects liquid water. However, the hydrogen in the separation chamber 40 will have a fairly high humidity; thus, it is important that this water be removed so as to produce ultradry hydrogen to be sent to charging station. In the schematic depiction in FIG. 4, the humidity-bearing hydrogen stream enters an inlet 81 at the upper left hand side of a precooling chamber 82 that has an interior wall surface that has reasonable thermal conductivity, e.g. metal, which is covered with a layer of a porous insulating material 82a, which is wettable. It exits this initial precooling chamber through a lower exit 83 at the right-hand side where it flows past a device 85 that presents a cold surface 85a which is maintained at a temperature about 2.5° C. or below, and preferably at about 0.5 to about 1° C. This cold surface 85a is preferably vertically aligned and causes condensation to occur and drip downward as the hydrogen gas gives up its humidity; the preferred cooling device is a Peltier device which is powered by the electrolyzer power supply. To further assist in removing humidity, the gas is routed through a series of baffles 87 in an underlying condensation chamber 89, where the water being condensed throughout the dryer collects in a pool at the bottom.

The cold hydrogen gas, which has given up substantially all of its humidity, is allowed escape upward at the left-hand edge of the condensation chamber through a passageway which connects to a conduit that includes a heat-exchanger coil section 91 that is disposed centrally of the precooling chamber 82 and an upper section 92 that exits the precooling chamber. The interior walls of the condensation chamber 89 and the exit passageway leading upward on the left-hand side are made of a hydrophobic material, such as polytetrafluoroethylene, to avoid any attraction to water that might then partially rehumidify the exiting stream of hyrdrogen gas. The purpose of the extended surface of the heat-exchanger coil section 91 is to precool the incoming stream in the initial chamber 82 and potentially cause some initial condensation on its surface which will run down into the condensation chamber 89 via gravity. The hydrogen leaving the chamber in the conduit 92 is caused to flow through a desiccant pack 93, which may include a bed of particulate silica gel. The desiccant unit 93 is connected into the $H_2$ gas flow network through a pair of isolation valves 95, which facilitate its removal and replacement upon the end of its useful life as a desiccant. About 50 to 100 cycles of charging hydrogen cartridges can be carried out before the desiccant unit 93 needs to be changed and recharged. The water, which condenses in the condensation chamber 89 is allowed to build up to a level above an exit 97 using a standard level controller (not shown); it then is removed through a valve 99, where it flows to an intake to a small pump 101 that sprays the water onto the upper surface of the porous insulated covering 82a surrounding the precooling chamber. As a result, it effects evaporative cooling of the chamber walls 82 which draws heat from the humidity-bearing hydrogen stream.

This ultradry hydrogen can be used to charge any type of metal alloy hydride cartridges, and it can also be used to directly power a portable electronic device. Such is generally shown and described in the '945 patent and in a counterpart International Publication WO 02/061861 (published 8 Aug. 2002), the disclosures of which are incorporated herein by reference.

The cartridge-charging station 18 shown schematically in FIG. 2 may simply provide a desired number of branches at the end of an ultradry hydrogen conduit 103 leading away from the desiccant station 93, with each branch terminating in a quick-disconnect fitting that will mate with fittings provided on the individual hydride cartridges. However, preferably the cartridge-charging station is designed to accommodate hydrogen cartridges 107 that employ room temperature alloy hydrides, that may provide an $H_2$ pressure of about 2 to 5 atmospheres, and high temperature metal alloy hydrides, that have a greater capacity per gram of weight for absorbing hydrogen as a hydride and that preferably provide an $H_2$ pressure of about 2 to 10 atm when at a higher temperature. As hereinbefore mentioned, the electrolyzer control unit 15 is provided with a hydrogen gas pressure monitor which reads the $H_2$ gas pressure somewhere in the $H_2$ conduit network, e.g. in the $H_2$ conduit 29 or the ultradry hydrogen conduit 103, via the pressure monitor 47 or the like, and it is set to halt further electrolysis when a target pressure representative of the type of cartridge being recharged has been reached or just slightly exceeded. As a result, operation of the electrolyzer will be halted until such time that the pressure should drop below the desired target pressure, which could occur either as a result of slow further absorption into the particular alloy materials contained in the cartridges or as a result of the concurrent operation of an electronic device that is utilizing hydrogen to power a fuel cell contained therein. The safety feature of the hydrogen and oxygen pressure relief valves is accomplished by setting those values at or just above the highest $H_2$ pressure that might be desired at the charging station, e.g. about 10 atm.

Figure 9:
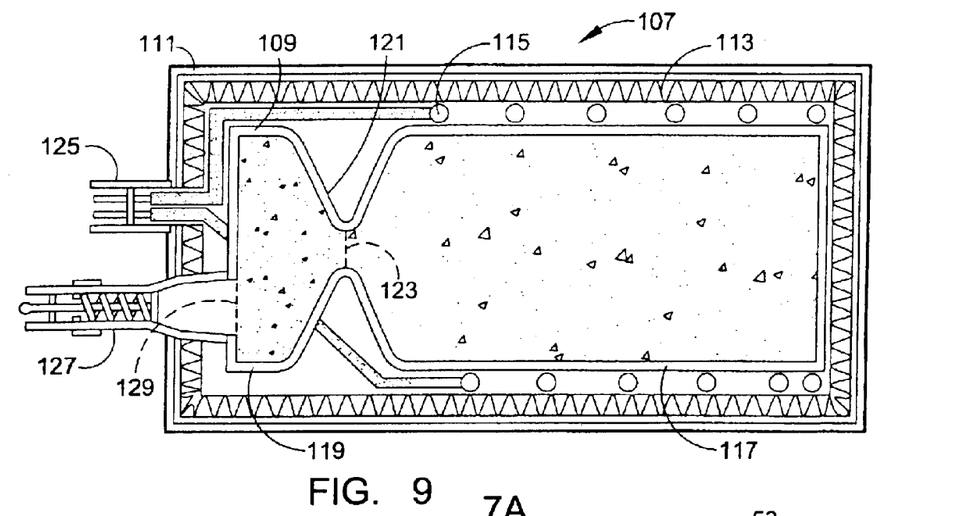
FIG. 9 is a cross sectional view of a speciality cartridge designed for holding both room temperature hydride and high temperature hydride metal alloys.

Illustrated in FIG. 9 is a preferred embodiment of a dual hydride cartridge 107 which is formed with an interior body 109 disposed centrally within an exterior metal casing 111, which are separated from each other by a layer of thermal insulation 113 and by an electric heater 115 surrounding a rear section 117 of the body 109. The interior body 109 is formed with a large rear 117 section that contains a high temperature metal alloy hydride particulate material and a smaller front section 119 which contains a room temperature metal alloy hydride particulate material. The inner body is formed with a neck 121 to provide a thermal choke which divides the two loads of particulate hydride material. Preferably, a circular screen 123 is provided at the opening through the thermal choke. The thermal choke 121 that is provided by necking the interior body of the cartridge is both effective in separating the two different charges of metal hydride and in confining the higher temperature region to the rear section 117 of the cartridge, which is important because, at an elevated temperature, the room temperature metal alloy hydride particulate material would desorb its hydrogen too quickly. The casing 111 is preferably formed of a suitable metal, such as stainless steel, and the inner body 109 is formed of a material having good thermal conductivity so as to conduct the heat from the surrounding heater to the particulate load packed therein, e.g. copper. The heater 115 may be any suitable heater, such as an electrical resistance heating coil, and a pair of leads connected to the coil extend to a 2-prong electrical plug 125 that extends through an opening in the front wall of the outer casing, providing an electrical connector that can be linked to a source of electrical power available at the charging station 18, which is regulated by the control unit 15. A gas port also extends through the front end wall of the interior body and through the outer casing 111 and terminates in a quick-disconnect fitting 127, which includes an interior spring-loaded valve as is known in this general art. A screen 129 at the opening from the front chamber of the inner body to the gas port confines the particulate room temperature metal hydride material within this chamber of the interior body.

The two different types of metal alloy hydride materials are well-known in the art and are marketed commercially. By room temperature metal alloy hydrides are meant those that will discharge a major portion of their hydrogen storage, and preferably at least about 90% thereof, at room temperature. By high temperature metal alloy hydrides are meant those alloys that require a temperature of 200° C. or above in order to discharge at least about 90% of the hydrogen carried thereby. The room temperature metal alloy hydride particulate materials may include iron-titanium-magnesium alloys, e.g. about 44 weight % iron, 55 weight percent titanium and 5 weight percent manganese; alternative suitable alloys include Mischmetal-nickel-aluminum hydrides. Such alloys are marketed commercially by Ergenics, under the trademark Hy-Stor™. One preferred alloy that is readily releases hydrogen at room temperature has a composition of about 45–50% Mn, 20–45% Ti, 10–15% Zr, 10–15% V, 2–5% Fe and 1–2.5% Ni. Such an alloy inherently provides between about 1.5 and about 3 atm of hydrogen pressure at about 25° C. Hydrogen storage alloys of this general type are described in U.S. Pat. No. 4,728,586 to Venkatesan, et al. and in U.S. Pat. No. 4,551,400 to Sapru, et al. and U.S. Pat. No. 6,099,811 discusses the general field of metal-hydride particulate storage systems, including those shown in U.S. Pat. No. 4,111,689, which require temperatures of at least 250° C. to completely expel substantially all of the hydrogen that is stored, and mentions promising magnesium-based alloys and also some alloys which exhibit rapid kinetics and store high amounts of $H_2$ which are based upon multi-phase alloys and require temperatures of about 250–300° C. to discharge the substantially all of the hydrogen stored. Still other of these alloys are described in U.S. Pat. No. 5,096,667, issued Mar. 17, 1992. A preferred high temperature metal alloy hydride material is that marketed by GKSS, which is a nanocrystalline material that may be made by the process described in U.S. Pat. No. 6,387,152 to GKSS. These nanocrystalline metal hydrides, which are effective to rapidly desorb their stored hydrogen at about 200° C., are also described in an article entitled "The Nanocrystalline Metal Hydrides for Hydrogen Storage," W. Ulrich et al., *Euromat* 13, 141–145 (2000).

When the cartridge 107 is plugged into the charging station 18, the quick-disconnect coupling 127 is connected to one of the branches of the ultradry $H_2$ conduit 103, and the electrical plug 125 is connected to the power supply through a relay or the like that is controlled by the control unit 15. Normally, the cartridge charging station is designed to charge a plurality of cartridges at once, e.g. 3–5 cartridges. With the cartridges in place, the electrolyzer is started by actuating the control unit 15 which connects the power supply to the anodes and cathodes and also to cartridge charging station 18. This begins the generation of hydrogen which flows through the hydrogen conditioning system 17 and fills the branch conduits of the ultradry hydrogen conduit 103. The ultradry hydrogen flows through the quick-disconnect couplings 127 and fills the interior of the inner body 109 of each cartridge where it becomes absorbed onto the surfaces of the particulate metal alloys in the form of hydride. The rear section of each cartridge is slowly warmed by an electrical resistance heater so as to raise its temperature above 200° C., e.g. to about 250° C., where it will absorb a greater quantity of $H_2$ at a faster rate. When a preset target pressure for a particular dual hydride cartridge is exceeded by about 5%, the control unit 15 momentarily removes power from the electrolyzer. If the cartridges are not fully charged, as is usually initially the case, the metal alloys will continue to slowly absorb hydrogen. When the pressure drops to a level more than 5% below the target pressure, electrolysis will again be resumed. During this entire period, the heaters 115 in the cartridges are thermostatically controlled so as to not significantly rise above the preset desired temperature, e.g. 250° C. When the control unit detects the pressure as not having fallen below the desired 5% value for a period of about 3 minutes following the removal of power from the electrolyzer, the charging is considered to be complete, and an indicator light is lit and/or an audible signal is given.

The use of cartridges 107 to power an electronic device 131, such as a personal laptop computer, is exemplified schematically in FIG. 10. One or more of such hydride cartridges 107 are installed in a compartment in the PC case, and the PC is ready to operate. When the user turns on the PC, initial power is provided by a small rechargeable battery that powers its control unit 133 and an air pump 135 which feeds air to the fuel cells 137. Hydrogen from the cartridges 107 flowing through the quick-disconnect couplings 127 provides $H_2$ pressure throughout the conduit network leading to fuel cells 137 about equal to that provided by the room temperature metal hydride. As soon as the fuel cells 137 are operating, the electrical power being generated flows through a filter capacitor 139 and a DC/DC converter 141; it takes over the powering of the electronic device through the control unit 133 and also begins to automatically recharge the small start-up battery. At the same time, the control unit 133 energizes the heating units 115 in each of the cartridges 107, so as to raise the temperature of the rear compartment 117 and its quantity of high temperature metal-hydride. This material begins to more rapidly desorb hydrogen and create an even higher pressure of $H_2$ gas throughout the $H_2$ conduit network. The control unit 133 monitors the pressure of hydrogen in the network leading to the fuel cells, and if it exceeds a desired maximum, power is momentarily removed from the heaters 115 until the pressure drops below some preset value, at which time heating is continued.

Thus, the use of the illustrated dual cartridges 107 has been effectively and efficiently incorporated into a fuel cell system for powering an electronic device 131 which allows operation of the device, on a single set of cartridges, for an extended period of time before those cartridges require recharging. Moreover, the illustrated electrolyzer is particularly well-suited to provide quantities of ultradry $H_2$ gas at a fairly rapid rate so as to effectively fully recharge such insulated dual metal hydride cartridges 107 in a reasonable time period by such thermostatically controlled heating.

Although the invention has been described with regard to certain preferred embodiments which constitute the best mode presently known to the inventors for carrying out their invention, it should be understood that various changes and modifications as would be obvious to one having the ordinary skill in this art may be made without departing from the scope of the invention, which is set forth in the claims appended hereto. For example, although the discussion is directed to the use of such cartridges for a fuel cell system to power a laptop PC, it should be understood that any of a variety of electronic devices could likewise benefit from these specialty dual-hydride cartridges. Moreover, although it is felt that there are substantial advantages which can be gained for the use of such dual hydride cartridges, it should also be understood that the novel electrolyzer can be advantageously employed to recharge cartridges containing only room temperature metal alloy hydride powders.

The disclosures of all of the previously mentioned U.S. patents are expressly incorporated herein by reference.

Particular features of the invention are emphasized in the claims that follow.

What is claimed is:

1. Apparatus for generating hydrogen by the electrolytic dissociation of water, which apparatus comprises:
an electrolytic cell having:
a plurality of molded plastic frames including two end frames and a plurality of center frames, arranged as a longitudinal stack,
each said end frame containing a well for receiving either an anode or a cathode,
each said center frame containing wells on opposite surfaces thereof for receiving, respectively, an anode and a cathode, and also containing a central barrier separating said wells,
a plurality of flat anodes and flat cathodes respectively located in said wells in alternating sequence in said assembly,
a flat solid electrolyte membrane disposed between each pair of anodes and cathodes that form one cell,
a pair of end plates for applying end-to-end pressure against said end frames in said stack
a pair of flat crushable metal plates that are located one outboard of each of said end frames and inboard of each of said end plates in said stack, and
means for squeezing said end plates toward each other in said stack,
means for supplying electrical power to said cell to apply a voltage thereacross,
means for providing a water reservoir for gravity flow independently to said cathode and anode half-cells on opposite sides of said solid electrolyte,
a hydrogen outlet chimney extending upward from said cathode half-cell,
a separation membrane located above said chimney which allows gaseous $H_2$ to pass through to an exit leading to hydrogen delivery passageway means but rejects liquid $H_2O$ carried with said $H_2$, and
a return passageway for returning liquid $H_2O$ separated from said $H_2$ by said membrane to a location near the bottom of said cathode half-cell.

2. The apparatus according to claim 1 wherein each said crushable metal plate is made of a stainless steel sheet having a thickness of between about 0.2 mm and about 0.5 mm which is deformed with an overall pattern of indentations to create a shaped plate that has a nominal thickness of at least about three times the thickness of the steel sheet.

3. The cell assembly according to claim 2 wherein said indentations are generally prismatic in form having a plurality of wall sections oriented at between about 45° and about 70° to the plane of the plate.

4. The cell assembly according to claim 2 wherein said frames are formed with grooves in a peripheral region thereof, which grooves each carry gaskets that seal against said solid electrolyte membrane near the periphery thereof to prevent liquid communication between said anode and said cathode of each cell.

5. The cell assembly according to claim 1 wherein each said anode and cathode comprises a first highly conductive flat metal screen having openings of a size less than about 2 mm, which screen is in surface-to-surface contact with said flat solid electrolyte membrane along one surface thereof.

6. The cell assembly according to claim 5 wherein each said anode and cathode also comprises a second metal screen having openings at least about 10% larger than said openings in said first screen, which is in contact with an opposite surface of said first screen.

7. Apparatus for generating hydrogen by the electrolytic dissociation of water, which apparatus comprises:
an electrolytic cell having anode and cathode half-cells that are located in compartments separated by a solid electrolyte,
means for supplying electrical power to said cell to apply a voltage thereacross,
means for providing a water reservoir for gravity flow independently to said cathode and anode half-cell compartments on opposite sides of said solid electrolyte,
a hydrogen outlet chimney extending upward from each said cathode half-cell compartment,
a separation membrane located above said chimney which allows gaseous $H_2$ to pass through to an exit leading to hydrogen delivery passageway means but rejects liquid $H_2O$ carried with said $H_2$,
means for providing a water reservoir for independent flow to each said half-cell compartment which includes separate conduits that serve as independent reservoirs for each half-cell, which conduits communicate with a water supply through a manifold valve member that, in one fill position, allows all said reservoir conduits to be replenished from a single water supply while simultaneously venting upper regions of said half-cell compartments to the atmosphere, and
a return passageway for returning liquid $H_2O$ separated from said $H_2$ by said membrane to said cathode half-cell compartments.

8. The apparatus according to claim 7 wherein said manifold valve member, in a second operating position, connects upper regions of said conduits leading to each said cathode half-cell to said separation chamber.

* * * * *